May 21, 1968 — J. M. HOUSTON — 3,384,776
THERMIONIC TUBE HAVING A NOVEL ELECTRODE
SUPPORT ARRANGEMENT
Filed Aug. 17, 1965
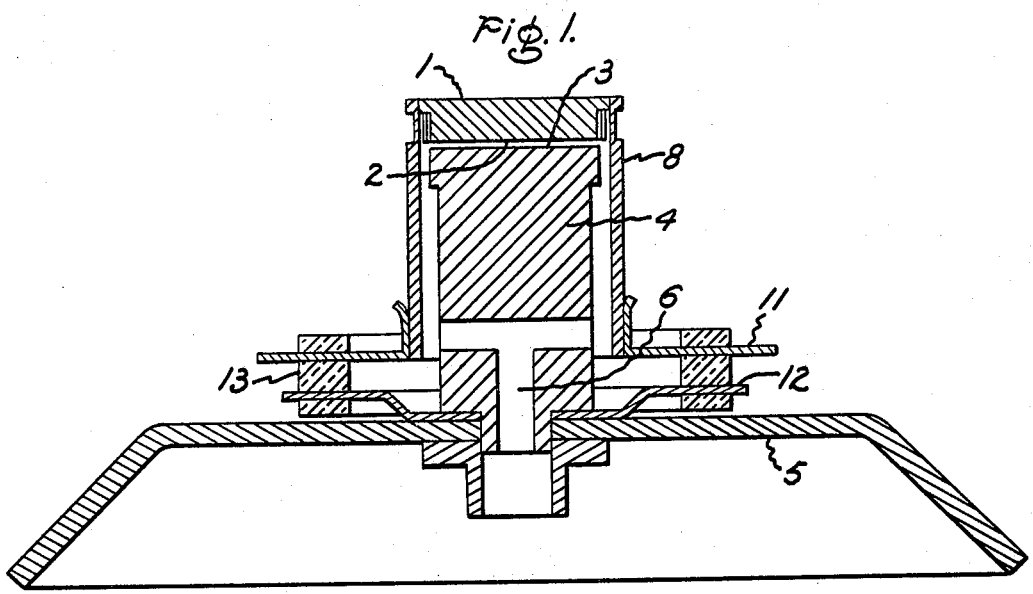
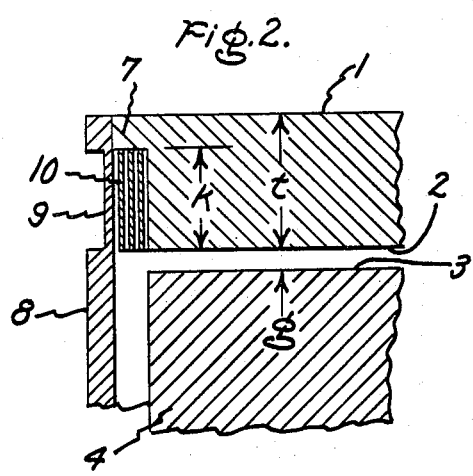
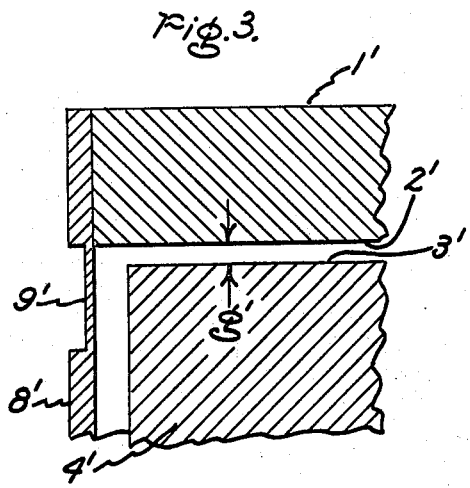
Inventor:
John M. Houston,
by John P. Dellett
His Attorney.

United States Patent Office 3,384,776
Patented May 21, 1968

3,384,776
THERMIONIC TUBE HAVING A NOVEL ELECTRODE SUPPORT ARRANGEMENT
John M. Houston, Schenectady, N.Y., assignor to General Electric Company, a corporation of New York
Continuation-in-part of application Ser. No. 419,862, Dec. 21, 1964. This application Aug. 17, 1965, Ser. No. 480,285
6 Claims. (Cl. 313—244)

This application is a continuation-in-part of application Ser. No. 419,862, filed Dec. 21, 1964, now abandoned, entitled, "Thermionic Converters," and assigned to the assignee of the present invention. This invention relates to thermionic devices and particularly to thermionic converters having close spacings between the electrodes thereof.

A thermionic converter is a device for the generation of electric power due to thermionic emission of electrons from a heated emitter electrode towards a collector electrode. The collector and emitter electrodes are desirably closely spaced in order that the maximum number of emitted electrons reach the collector electrode. Because of their high operating temperature, thermionic converters are designed such that expansion of the parts during converter operation will produce final electrode spacing.

In one type of thermionic converter having planar electrodes, the emitter and collector are arranged to touch each other during the initial manufacture. Subsequent temperature elevation moves the emitter electrode away from the collector electrode because of the thermal expansion of a cylindrical member or sleeve which supports the emitter. This expansion often produces a larger emitter-collector gap than is desirable for maximum power output.

It is therefore an object of the present invention to provide an improved thermionic device construction wherein the electrode spacing is held to a specified value during high temperature operation.

According to the thermionic device of the present invention, a cylindrical member or sleeve which supports an electrode, e.g. the emitter, is joined to an extension or flange of that electrode at a point thereon appreciably behind its surface. When this electrode is then heated, it expands towards the opposite electrode as its support sleeve expands and moves in the opposite direction. The desired degree of compensation may be achieved so a desired emitter-collector spacing exists during operation of the device. The support sleeve has a thin insulating section adjacent and desirably coextensive with the supported electrode for taking the heat drop between the aforementioned flange and the remainder of the support sleeve. Since the heat drop takes place in this area, one electrode is capable of expanding towards the other without the support sleeve producing expansion in the opposite direction which is not efficiently compensated.

The subject matter which I regard as my invention is particularly pointed out and distinctly claimed in the concluding portion of this specification. The invention, however, together with further objects and advantages thereof, may best be understood by reference to the following description taken in connection with the accompanying drawings wherein like reference charatcers refer to like elements and in which:

FIG. 1 is a cross-sectional view of a thermionic converter in accordance with an embodiment of the present invention, FIG. 2 is an enlarged view of a portion of the FIG. 1 cross-section, and FIG. 3 is a cross-section of a prior art thermionic converter construction.

Referring to FIGS. 1 and 2, a thermionic device in accordance with an embodiment of the present invention comprises a cylindrical emitter or cathode electrode 1, having a planar end emitting surface 2, spaced from the planar end surface 3 of a cylindrical anode or collector electrode 4. Collector electrode 4 is supported upon a common support base 5 which may take the form of a black copper fin. A passage 6 in the anode electrode conveys alkali metal vapor, e.g. cesium vapor, to the anode electrode surface between electrode surfaces 2 and 3 to enhance the passage of electrons therebetween.

Cylindrical emitter electrode 1 having a finite axial length, $t$, has a first diameter near the surface 2, which diameter conveniently approximates that of the cylindrical collector electrode 4. However, rearward from planar surface 2, the diameter of the emiter electrode is desirably increased to provide a radially extending flange 7. This flange or extension is secured at its outer edge to cylindrical support sleeve 8 forming a part of the outer enclosure of the thermionic converter extending towards and at least partially surrounding collector electrode 4. Support sleeve 8 is ultimately supported by common base 5.

As can be seen from the above described construction, the emitter electrode extends or depends from a flange 7 towards the anode electrode. The distance between flange 7 and the emitting surface 2 is designated with the letter $k$. It should be noted here that this construction differs from that of the prior art as illustrated in FIG. 3 wherein a thin portion, 9′, of support 8′ adjoins the emitter at the bottom surface of the emitter, with the support sleeve abutting and substantially joined to the emitter along its cylindrical side from emitting bottom surface 2′ upwards. In this prior art construction, upward expansion of the support sleeve 8′ causes the interelectrode gap, g′, to open up to about 0.002 inch at typical emitter operating temperatures (e.g. 2000±300° K.). For maximum power output at a high emitter temperature a smaller interelectrode gap than this is very desirable, such smaller gap being achieved with the present invention as hereinafter explained.

The support sleeve 8 in the embodiment of the present invention as illustrated in FIG. 2 is narrowed to a thin section 9 to provide heat insulation preventing excessive transmission of heat along the support sleeve away from the emitter, but inasmuch as the support sleeve carries current from the emitter, thin section 9 is not so narrow as to introduce excessive electrical resistance in the emitter circuit. A considerable heat drop, typically 500 to 1200 degrees, takes place along thin section 9. According to the present invention, this section is desirably adjacent flange 7 where the sleeve is secured to the emitter, and is *coextensive* at least along a part of the emitter electrode 8. Heat shielding material 10, which may comprise dimpled foil, is located between emitter 1 and support sleeve 8.

The support sleeve 8 is secured at its remote end to an annular spinning 11, which is in turn secured to a second spinning 12 by means of annular ceramic member 13 providing insulation between the emitter and collector circuits. Spinning 12 is in turn secured to common base 5. Current conductors (not shown) are ordinarily attached at 11 and any convenient point on common base 5.

A thermionic converter in accordance with the present invention is formed almost entirely of refractory materials because of the high temperatures at which such converter operates. During operation, the emitter 1 is heated to a very high temperature, e.g. 2000° K. The emitter 1, in an exemplary embodiment according to the present invention, is tantalum, while the collector is formed of molybdenum. Sleeve 8, also formed of tantalum, is joined to niobium spinning 11 employing a copper-titanium braze therebetween. Spinning 12 may also be niobium.

The emitter, collector and sleeve material, and other refractory materials which might be used, have low but similar thermal coefficients of expansion. To achieve a proper spacing during operation, the converter is preferably manufactured and assembled with the emitter resting on the collector surface as a copper-titanium braze between parts 8 and 11 is made at about 900° C. The converter electrode spacing during operation is then necessarily affected by thermal expansion of the support sleeve 8, and particularly thin section 9 thereof, since most of the heat drop from the heated emitter occurs in thin section 9 with a portion of thin section 9 being quite high in temperature. The collector generally operates at about 500° C. and expands upward slightly (compared to its room temperature position), but the support sleeve below section 9 will have an average temperature somewhat greater than 500° C. (e.g. 800° C.) and will expand upward along with the collector.

The thin section 9 of the support sleeve has portions which reach approximately 1950° K. and it therefore expands, tending to open up the emitter-collector gap. Attempts to reduce the gap by making thin section 9 quite short have not been altogether successful. If the thin section is made very short, it must also be made very thin to reduce thermal conduction, but there are limits as to how thin a vacuum-tight tantalum sleeve can be fabricated. In an exemplary embodiment according to the present invention, thin section 9 has a cross-sectional thickness of about 2 mils which is about as thin as tantalum can be easily machined.

In accordance with an embodiment of the present invention, the support sleeve attaches to the emitter and particularly to flange 7 thereof circumferentially around the emitter, in a plane rearward or away from the collector, leaving the depending length, $k$, of the emitter extending away from the planar support sleeve towards the collector electrode. In accordance with the operation of the present invention, as the support sleeve and particularly thin section 9 thereof expands upwardly, the emitter itself expands downwardly, whereby to compensate for the expansion of the support sleeve. The gap, $g$, is approximately given by:

$$g = h - \alpha(T_E - T_{Br})k$$

In this equation $T_E$ is the emitter operating temperature; $T_{Br}$ is the temperature of the final braze during converter construction, e.g. 900° C.; $\alpha = \Delta L/L$, the thermal expansion ratio of the emitter per degree; $k$ is the depending axial length of the emitter away from its plane of support; and $h$ is the interelectrode gap which would exist in the converter without utilizing the expansion of the emitter, i.e., that which would exist if the thin section were joined to the emitter at its front face (as in FIG. 3).

Various advantageous electrode spacings can be achieved in this manner. For example, if $h$ equals 2 mils, $T_E$ equals 1950° K., $\alpha$ equals $6.8 \times 10^{-6}$ per degree C. and $T_{Br}$ equals 1200° K., the equation requires $k$ to be 294 mils in order to yield a $g$ spacing of ½ a mil. Many emitters have thicknesses nearly this great but are supported at their front surfaces rather than rearward of the front surface by the above dimension, $k$, as in the present invention.

As hereinbefore stated it is desired the thin section 9 of support sleeve 8 be adjacent the supported circumference of emitter 1 in order to achieve the desired compensation as set forth above. If the thin section were below the plane of the gap, a longer portion of the support sleeve resides at a high temperature and the construction above the thin section 9 would appear unitary to the thin section and would expand upward as a unit whereby compensation is not practical. In accordance with the present invention, the temperature drop in the thin section desirably occurs immediately adjacent the emitter electrode where the emitter electrode is joined at the support sleeve.

While I have shown and described an embodiment of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A thermionic device comprising a first electrode having a first planar surface and having a rearward support base, a second electrode for operation at a high temperature having a second planar surface in spaced relation to said first planar surface, and a support for said second electrode extending from said support base and past said electrode surfaces to said second electrode where it is secured thereto behind its planar surface, wherein said support has a heat insulating section coextensive with at least a portion of said second electrode, said thin section providing a temperature drop away from said second electrode.

2. A thermionic device comprising a first electrode having a first planar surface and having a rearward support base, a second electrode having a second planar surface in spaced relation to said first planar surface, and a cylindrical support for said second electrode secured to said second electrode around a periphery of said second electrode behind its planar surface and extending coaxially around said second electrode toward said first electrode where it is secured to said support base, wherein said cylindrical support has a thin section which is coextensive with at least a portion of said second electrode, said thin section providing a temperature drop away from said second electrode.

3. A thermionic device comprising a first electrode having a cylindrical body and a first planar end surface, a second electrode having a cylindrical body and a planar end surface in spaced relation to said first planar end surface, and a cylindrical support for said second electrode secured to said second electrode around a periphery of said second electrode behind its planar surface, wherein said cylindrical support is larger in diameter than said second electrode at its planar surface and said cylindrical support has a cylindrical axis substantially perpendicular to said planar surfaces with a thin section extending axially towards said periphery and away from said first electrode which thin section is coextensive with at least a portion of said second electrode body, said thin section providing a temperature drop away from said second electrode.

4. A thermionic converter comprising a collector electrode having a first planar surface, an emitter electrode adapted to be heated having a planar surface in spaced relation to said first planar surface, a cylindrical support for said emitter electrode secured to said emitter electrode around a periphery of said second electrode behind its planar surface, said cylindrical support surrounding the forward portion of said emitter electrode, wherein said cylindrical support has a cylindrical axis substantially perpendicular to said planar surfaces and a thin section extending axially towards said periphery and away from said collector electrode which thin section is coextensive with at least a portion of said emitter electrode, said thin section providing a temperature drop away from said emitter electrode, and common base means for said collector electrode and said cylindrical support including insulating means therebetween.

5. A thermionic device comprising a collector electrode having a cylindrical body and a first planar end surface, an emitter electrode which is adapted to be heated having a cylindrical body substantially coaxial with said collector electrode and having a planar end surface in parallel spaced relation to said collector electrode end surface, a support sleeve for said emitter electrode secured to said emitter electrode around a periphery of said cylindrical body behind the planar surface wherein said sleeve is larger in diameter than said emitter electrode at its planar surface said support sleeve extending coaxially of said electrodes from said periphery towards said collector electrode, said emitter electrode surface depending from said periphery towards said collector electrode, said support sleeve having a thin section closely adjacent said periphery of said emitter electrode providing a temperature drop away from said emitter electrode, and a common base means for said collector electrode and support sleeve including insulating means therebetween.

6. A thermionic device including a cylindrical anode with a flat electrode end surface and a cylindrical cathode having a flat end surface in parallel spaced relation to said anode and adapted to be heated for emitting electrons towards said anode, said cathode having a cylindrical flange of greater diameter than the remainder of said cathode disposed rearwardly of the emitting surface thereof, a cylindrical support sleeve secured to said flange having a larger diameter than the remainder of said cathode extending in enclosing relation to the rest of said cathode toward said anode, said support sleeve having a section of smaller thickness than other portions of said sleeve extending entirely around the circumference of said sleeve adjacent said cathode for providing a temperature drop away from said cathode, and common base means for said anode and said support sleeve including insulating means therebetween, said cathode and said support sleeve being formed of highly refractory metals having similar coefficients of expansion.

References Cited
UNITED STATES PATENTS 3,327,156    6/1967    Gerlach _____ 313—250
3,351,800    11/1967    Beggs _____ 313—244

JOHN W. HUCKERT, *Primary Examiner.*

R. F. POLISSACK, *Assistant Examiner.*